United States Patent [19]

Rukavina et al.

[11] 4,335,187

[45] Jun. 15, 1982

[54] METHOD FOR BONDING POLYCARBONATE TO METAL

[75] Inventors: Thomas G. Rukavina, Lower Burrell; Alfred L. Maryland, Pittsburgh, both of Pa.

[73] Assignee: PPG Industries, Inc., Pittsburgh, Pa.

[21] Appl. No.: 239,854

[22] Filed: Mar. 2, 1981

[51] Int. Cl.$^3$ ............................................. B32B 27/36
[52] U.S. Cl. ................................. 428/412; 428/423.1; 428/425.8; 156/331.1; 156/331.4
[58] Field of Search .................. 428/412, 425.8, 423.1; 156/331.1, 331.4; 528/60

[56] References Cited

U.S. PATENT DOCUMENTS

| | | | |
|---|---|---|---|
| 3,258,356 | 6/1966 | Caldwell et al. | 117/72 |
| 3,622,440 | 11/1971 | Snedeker et al. | 161/193 |
| 4,004,050 | 1/1977 | Rabito et al. | 427/302 |
| 4,103,050 | 7/1978 | Laskin et al. | 427/379 |
| 4,204,374 | 5/1980 | Olson | 428/412 |
| 4,301,053 | 11/1981 | Wolfrey | 428/425.8 |

Primary Examiner—George F. Lesmes
Assistant Examiner—B. K. Johnson
Attorney, Agent, or Firm—Donna L. Seidel

[57] ABSTRACT

A method and article are disclosed wherein metal is bonded to polycarbonate by a polyurethane adhesive which comprises an isocyanate-terminated polyester urethane crosslinked with a trifunctional species such as triisopropanolamine.

10 Claims, No Drawings

METHOD FOR BONDING POLYCARBONATE TO METAL

BACKGROUND

The present invention relates generally to the art of bonding polycarbonate to metal, and more particularly to the art of bonding polycarbonate to stainless steel at relatively low temperatures.

Aircraft windshields are commonly laminated articles comprising an exposed polycarbonate ply, and also comprising stainless steel bearing strips adhered to the polycarbonate along the aft edge of the windshield. It has been customary to bond both inboard and outboard metal retainers to polycarbonate using silicone adhesives, chosen for their resistance to adverse environments and their flexibility over a wide range of temperatures. However, these silicones are inherently relatively weak materials, and do not have sufficient strength to withstand the force generated by impact. For example, upon bird impact, the inboard metal bearing strip may debond, exposing the polycarbonate and providing a potential for damage inside the cockpit.

Since the inboard side of an aircraft windshield is not exposed to as severe an environment as is the outboard, a silicone adhesive may be advantageously replaced on the inboard side with a stronger adhesive so long as the stronger adhesive meets the requirements of compatibility with polycarbonate, high peel and tensile strength, thermal stability and solvent resistance. In addition, for process feasibility, the adhesive should have a reasonable pot life but still be curable at moderate temperatures, and should be relatively safe to process. A two component system may be preferred.

SUMMARY OF THE INVENTION

The present invention provides high strength, flexible bonding between a metal retainer and a polycarbonate surface using a low temperature curable polyurethane adhesive comprising an isocyanate terminated polyester urethane prepolymer which is crosslinked with a trifunctional isocyanate received compound.

DESCRIPTION OF THE PREFERRED EMBODIMENTS

A metal retainer is adhered to a polycarbonate surface with a polyurethane adhesive composition which comprises an isocyanate terminated polyester urethane prepolymer which is crosslinked with a trifunctional isocyanate reactive compound to form a flexible high strength bond. The metal retainer is typically stainless steel, while the polycarbonate is generally the inboard surface of a laminated aircraft windshield.

The polyurethane adhesive is prepared in the following manner. A viscous prepolymer, preferably a polyester urethane end-capped with toluene diisocyanate, is heated at a temperature of about 180° to 200° F. (about 82° to 93° C.) and degassed until it is bubble-free, typically about 15 minutes. An approximately stoichiometric amount of a trifunctional crosslinking agent, typically is trifunctional amine and preferably triisopropanolamine, is then mixed into the prepolymer and the mixture is degassed until bubble-free. The polyurethane adhesive is then ready for use. The degassed reaction mixture typically has a pot life of about 20 minutes at this temperature.

The metal, preferably stainless steel, retainer is preferably prepared for bonding by first abrading the surface, then cleaning it with acetone, and finally etching it with acid solution. The acid etching (preferably accomplished with an aqueous solution of 4 percent by volume hydrofluoric acid and 20 percent by volume nitric acid) removes an uneven oxide layer from the metal surface. After etching, the metal surface is preferably rinsed with distilled water and dried in an oven at about 150° F. (about 65° C.). An evenly distributed oxide layer forms on the metal surface, which is then primed with a bonding agent, such as a phenolic resin, for adhering urethane elastomers to metal. A preferred primer is Chemlok ® 218 Bonding Agent available from Hughson Chemicals, Erie, PA. Preferably, a dilute solution of the primer is applied, dried at ambient temperature for about 15 minutes, and then dried at 250° F. (about 120° C.) for about 15 minutes.

Preferably, the polyurethane adhesive is applied to the polycarbonate surface, which is then placed in contact with the metal retainer. In contrast with previous bonding methods utilizing silicone adhesives, no abrasion of the polycarbonate surface is necessary, nor is any primer needed on the polycarbonate surface. Rather, the viscous prepolymer/triamine reaction mixture is simply applied to the polycarbonate surface, which is then placed in contact with the primed metal retainer. The viscosity of the prepolymer/crosslinking agent reaction mixture is important, since if the viscosity is too low, the adhesive will flow out from the polycarbonate/metal interface, while if the viscosity is too high, the adhesive will not properly wet the substrate, resulting in lower adhesion. Suitable viscosity is generally attained if the prepolymer has a Brookfield viscosity of about 900 to 2000 poises at ambient temperature. Higher viscosity reaction mixtures may be utilized by adding a wetting agent.

Once the polyurethane reaction mixture is in place between the polycarbonate surface and the primed metal retainer, the adhesive is fully cured by heating at a temperature of about 180° F. (about 82° C.) for about 5 hours. This temperature is sufficiently low that the optical quality of a preformed windshield is not jeopardized. In contrast, a typical silicone adhesive curing cycle requires 24 hours at ambient temperature followed by 8 hours curing at 180° F. (about 82° C.). Generally, the polyurethane bond of the present invention has more than 10 times the tensile strength of a typical silicone adhesive, and about twice the elongation, thereby allowing the polyurethane bond to absorb more energy upon impact.

The preferred prepolymers of the present invention are toluene diisocyanate end-capped polyester urethanes having an equivalent weight of about 350 to 600 and a room temperature Brookfield viscosity of about 900 to 2000 poises. Preferred crosslinking agents are trifunctional organic compounds capable of reacting with the isocyanate end groups of the prepolymer, such as triols and triamines. A preferred crosslinking agent is triisopropanolamine because no additional catalyst is needed to crosslink the prepolymer when triisopropanolamine is employed.

The present invention will be further understood from the description of a specific example which follows.

EXAMPLE

A stainless steel retainer strip 0.030 inch (about 0.8 millimeters) thick is abraded with 120 grit sandpaper, cleaned with acetone, and etched for 15 minutes at 150° F. (about 65° C.) in an aqueous solution of 4 percent by volume hydrofluoric acid and 20 percent by volume nitric acid. The acid etching removes an uneven oxide layer from the metal surface, while the nitric acid oxidizes any iron particles on the abraded surface. The etched surface is rinsed, first with tap water then with distilled water, and dried in an oven at 150° F. (about 65° C.) The etched surface is then primed by applying a dilute solution of Chemlok ® 218 bonding agent, drying for 15 minutes at ambient temperature, and finally drying for 15 minutes at 250° F. (about 120° C.). The primed stainless steel retainer strip is then placed in contact with a polyurethane adhesive which has been applied to a polycarbonate surface. The polyurethane adhesive is prepared by placing a quantity of toluene diisocyanate end-capped polyester urethane prepolymer in a desiccator in an oil bath at a temperature of about 180° to 200° F. (about 82° to 93° C.). The prepolymer, available as Solithane ® 670 M Resin from Thiokol Corporation, Trenton, N.J., is degassed for about 15 minutes. An equivalent amount of triisopropanolamine, also available from Thiokol Corporation as TC-700 curing agent, is melted by heating to a temperature above about 145° F. (about 62° C.), and added to the prepolymer. The reaction mixture is degassed for an additional 15 minutes before it is applied to the polycarbonate surface, which requires neither abrasion nor priming. The viscosity of the reaction mixture is sufficiently high that the adhesive does not run off when applied to a curved windshield surface. With the stainless steel retainer in place, the windshield assembly is placed in an oven at a temperature of 180° F. (about 82° C.) for about 5 hours to fully cure the polyurethane adhesive. Tested at ambient temperature, the polyurethane bond between the metal and the polycarbonate exhibits a lap shear strength of 1277.8 pounds per square inch (about 89.4 kilograms per square centimeter) and a peel strength of 48 to 75 pounds per inch (about 8.5 to 13.5 kilograms per centimeter). For comparison, a typical silicone bond exhibits a lap shear strength of 652.5 psi (about 45.7 kg/cm$^2$) and a peel strength of 17.6 ppi (about 3.1 kg/cm).

The above example is offered to illustrate the present invention which includes various modifications. For example, other metals, such as aluminum, can be bonded to polycarbonate, and other primer layers can be employed, such as a polyurethane layer pressed onto the polycarbonate surface. Other prepolymer compositions, as well as other crosslinking agents, may be employed. The scope of the present invention is defined by the following claims.

What is claimed is:

1. A method for bonding metal to polycarbonate comprising the steps of:
   a. preparing a reaction mixture comprising substantially equivalent proportions of
      (1) an isocyanate terminated polyester urethane prepolymer; and
      (2) a trifunctional species capable of crosslinking said prepolymer;
   b. applying said reaction mixture at the interface of the metal and polycarbonate surfaces to be bonded; and
   c. curing said reaction mixture.

2. The method according to claim 1, wherein said prepolymer is a toluene diisocyanate terminated polyester urethane prepolymer having an equivalent weight between about 350 and 600.

3. The method according to claim 1, wherein said trifunctional species is a triamine.

4. The method according to claim 3, wherein said triamine is triisopropanolamine.

5. The method according to claim 1, wherein said metal is stainless steel.

6. The method according to claim 5, wherein the surface of said stainless steel is prepared for bonding by applying a primer.

7. An article of manufacture comprising
   a. a polycarbonate component;
   b. a metal component; and
   c. a polyurethane adhesive bonding said metal to said polycarbonate, which adhesive comprises an isocyanate terminated polyester urethane prepolymer crosslinked by a trifunctional isocyanate reactive species.

8. An article according to claim 7, wherein said metal is stainless steel.

9. An article according to claim 7, wherein said prepolymer is a toluene diisocyanate terminated polyester urethane having an equivalent weight between about 350 and 600.

10. An article according to claim 7, wherein said trifunctional species is triisopropanolamine.

* * * * *